Patented Jan. 2, 1945

2,366,498

UNITED STATES PATENT OFFICE

2,366,498

NEW COMPOSITION OF MATTER

Melvin De Groote, University City, and Bernhard Keiser, Webster Groves, Mo., assignors to Petrolite Corporation, Ltd., Wilmington, Del., a corporation of Delaware No Drawing. Original application June 27, 1940, Serial No. 342,723. Divided and this application November 21, 1942, Serial No. 466,506

8 Claims. (Cl. 260—404.5)

This invention relates to a new composition of matter, our present application being a division of our co-pending application Serial No. 342,723, filed June 27, 1940, which subsequently matured as U. S. Patent No. 2,306,718, dated December 29, 1942.

The object of our invention is to provide a new material or compound that is adapted for use as a demulsifier in the resolution of crude oil emulsions, and also capable of use for other purposes. For instance, said new material or compound may be used as a break inducer in doctor treatment of the kind intended to sweeten gasoline. See U. S. Patent No. 2,157,223, dated May 9, 1939, to Sutton. Certain of the compounds which represent different examples of the new composition of matter which constitutes our present invention, are also of value as surface tension depressants in the acidization of calcareous oil-bearing strata by means of strong mineral acid, such as hydrochloric acid. Similarly, some members are effective as surface tension depressants or agents in the flooding of exhausted oil-bearing strata.

As to using compounds of the kind herein described as flooding agents for recovering oil from subterreanean strata, reference is made to the procedure described in detail in U. S. Patents Nos. 2,233,381 and 2,233,382, dated February 25, 1941, to De Groote and Keiser.

As to using compounds of the kind herein described as demulsifiers, or in particular as surface tension depressants, in combination with mineral acid for acidization of oil-bearing strata, reference is made to U. S. Patent No. 2,233,383, dated February 25, 1941, to De Groote and Keiser.

The new composition of matter that constitutes our present invention, can be produced by reacting a polybasic carboxy acid, or its functional equivalent, such as the anhydride, and more particularly, phthalic anhydride, with products of the kind characterized by the following formulae:

$$ND_2.T.(T.ND)_x.ND_2$$

$$\overline{-(T.ND)_x.T.ND.T.ND-}$$

in which $x$ is a small whole number less than 10, but including 0; T is an oxyhydrocarbon radical selected from the class consisting of the keto type, the ether type, and the alcohol type; and D may be hydrogen, alkyl, alkylol, hydroxyalkyloxyalkyl, aminoalkyl, hydroxyalkylamino, RCO, RCO.OX, RCO.OX', RCO.OX'', RCO.OX''', R'CO, R'CO.OX, R'CO.OX', R'CO.OX'', and R'CO.OX''', in which RCO is an acyl radical derived from a higher molecular weight carboxy acid having more than 6 carbon atoms; R'CO is an acyl radical derived from a lower molecular weight carboxy acid having 6 carbon atoms or less; OX represents a divalent radical obtained by removal of a hydroxyl hydrogen atom from an alkylol radical; OX' represents a radical derived by removal of a hydroxyl hydrogen atom from a hydroxyalkyloxyalkyl radical; OX'' represents a divalent radical derived by the removal of an amino hydrogen atom from an aminoalkyl radical; and OX''' represents a radical derived by removal of a hydrogen atom from a hydroxyalkylamino radical; and with the added proviso that RCO must occur at least once. In order for a polybasic acid to combine with an acylated amine of the kind above described, there must be present a reactive hydrogen atom, i. e., either an amino hydrogen atom, or a hydroxyl hydrogen atom, all of which will be indicated in greater detail subsequently. Said new material or composition of matter is a particularly effective demulsifier for petroleum emulsions of the water-in-oil type.

The expression "higher molecular weight carboxy acids" is an expression frequently employed to refer to certain organic acids, particularly monocarboxy acids, having more than 6 carbon atoms, and generally less than 40 carbon atoms. The commonest examples include the detergent-forming acids, i. e., those acids which combine with alkalies to produce soap or soap-like bodies. The detergent-forming acids, in turn, include naturally occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources and are different in structure, but can be included in the broad generic term previously indicated.

Among sources of such acids may be mentioned straight chain and branched chain, saturated and unsaturated carboxylic, aliphatic, alicyclic, fatty, aromatic, hydroaromatic, and aralkyl acids, including caprylic acid, butyric acid, heptylic acid, caproic acid, capric acid, pimelic acid, sebasic acid, erucic acid, saturated and unsaturated higher molecular weight aliphatic acids, such as the higher fatty acids containing at least 8 carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, chloracetyl-ricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soybean oil, peanut oil, castor oil, seal oils, whale oil, shark oil, and other fish oils, teaseed oil, partially or completely hydrogenated animal and vegetable oils, such as those mentioned; hydroxy and alpha-hydroxy higher carboxylic, aliphatic and fatty acids, such as dihydroxystearic acid, dihydroxy palmitic acid, dihydroxybehenic acid, alphahydroxy capric acid, alphahydroxystearic acid, alphahydroxy palmitic acid, alphahydroxy lauric acid, alphahydroxy myristic acid, alphahydroxy cocoanut oil mixed fatty acids, alphahydroxy margaric acid, alphahyroxy arachidic acid, and the like; fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived by oxidation and other methods, from paraffin wax, petroleum and similar hydrocarbons; resinic and hydroaromatic acids, such as hexahydrobenzoic acid; hydrogenated naphthoic, hydrogenated carboxy diphenyl, naphthenic, and abietic acid; aralkyl and aromatic acids, such as benzoic acid, Twitchell fatty acids, naphthoic acid, carboxydiphenyl pyridine carboxylic acid, hydroxybenzoic acid, and the like.

Other suitable acids include phenylstearic acid, benzoylnonylic acid, campholic acid, fencholic acid, cetylbutyric acid, cetyloxyacetic acid, chlorstearic acid, etc.

Alkylene polyamines, characterized by the fact that two or more amino nitrogen atoms are joined by an alkylene radical are well known. Such compounds may be either open chain compounds of the following general formula:

NH$_2$.C$_2$H$_4$.(C$_2$H$_4$.NH)$_x$.NH$_2$ where $x$ is a whole number; or they may be ring compounds having the general formula:

where $x$ is a whole number. The first group is exemplified by diethylene triamine, (NH$_2$.C$_2$H$_4$.NH.C$_2$H$_4$.NH$_2$)

triethylene tetramine, (NH$_2$.C$_2$H$_4$.NH.C$_2$H$_4$.NH.C$_2$H$_4$.NH$_2$)

and tetraethylene pentamine, (NH$_2$.C$_2$H$_4$.NH.C$_2$H$_4$.NH.C$_2$H$_4$.NH.C$_2$H$_4$.NH$_2$)

Examples of the second group are diethylene diamine:

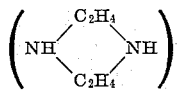

and triethylene triamine:

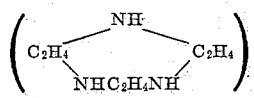

In the above formulas the radical C$_2$H$_4$ is simply a divalent linking radical. Thus, preceding formulas may be rewritten as follows:

NH$_2$.T.(T.NH)$_x$.NH$_2$

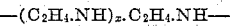

(NH$_2$.T.NH.T.NH$_2$)
(NH$_2$.T.NH.T.NH.T.NH$_2$)
(NH$_2$.T.NH.T.NH.T.NH.T.NH$_2$)

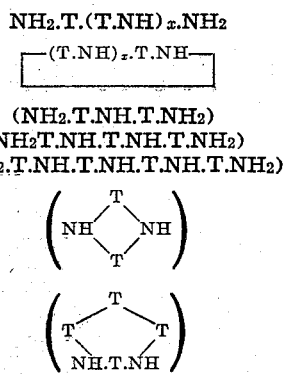

in which T represents any suitable divalent linking radical. If T is an oxygenated divalent linking radical of the kind to be described, and if such polyamines are acylated so as to introduce an acyl radical from a high molecular weight carboxy acid of the kind previously defined, one obtains an intermediate material which can be acylated to yield a new composition of matter and a compound or a variety of compounds which are particularly effective as demulsifiers for water-in-oil emulsions.

Generally speaking, the oxygenated divalent linking radical is exemplified by three types; the keto type, in which the conventional carbonyl linkage appears; the ether type, in which the conventional ether linkage appears, and the hydroxylated type, in which the conventional alcoholic hydroxy radical appears. One of the best known examples are compounds obtained from ββ'-dichloralkyl ethers instead of alkylene dichlorides. Such compounds are characterized by the preceding formulas if one adds the proviso that in such formulas T shall represent the divalent radical CH$_2$CH$_2$OCH$_2$CH$_2$. As to the manufacture of such compounds, see U. S. Patent No. 1,919,301, dated July 25, 1933, to Morton. Said patent is concerned largely with compounds containing an aryl radical; but of course, the same procedure is equally effective in connection with ammonia or amines free from an aryl radical and containing at least one reactive hydrogen atom; i. e., the selected amines must be primary or secondary. Furthermore, one is not limited to the ethyl ether halogen derivative; but one may use the propyl ether halogen derivative or any other suitable compound. If derived from ammonia, such diamines may be alkylated in the manner commonly employed for alkylating ordinary amines, i. e., monoamines. Alkylation may result in products which are symmetrically or non-symmetrically alkylated. The symmetrically alkylated diamines are most readily obtainable. For instance, alkylated products may be derived by reaction between alkyl chlorides, such as propyl chloride, butyl chloride, amyl chloride, cetyl chloride, and the like. Such reaction products result in the formation of hydrochloric acid, and the resultant product consists of an amine hydrochloride. The conventional method for conversion into the base is to treat with dilute caustic solution. Alkylation is not limited to the introduction of an alkyl group; but as a matter of fact, a radical may be introduced characterized by the fact that the carbon atom chain is interrupted at least once by an oxygen atom. In other words, alkylation may be accomplished by compounds which are essentially alkyloxyalkyl chlorides, as, for example, the following:

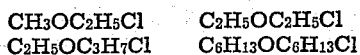

CH₃OC₂H₅Cl    C₂H₅OC₂H₅Cl
C₂H₅OC₃H₇Cl    C₆H₁₃OC₆H₁₃Cl

As a matter of common knowledge, reactions involving ammonia and an alkyl ether dichloride probably go through an intermediate stage which involves the formation of aminoalkyl ether halide. As a result, one has another suitable procedure for manufacture of the diamines, i. e., a reaction involving amino alkyl ether halides and a monoamine. See British Patent No. 292,615, to I. G. Farbenindustrie, A.-G., application date in the United Kingdom June 22, 1928.

As has been previously stated, the reaction involving the alkyl ether dichlorides is not limited to ammonia, but may involve amines, such as ethylamine, propylamine, butylamine, octylamine, decylamine, cetylamine, dodecylamine, etc. Similarly, the reaction may involve the comparable secondary amines, in which various alkyl radicals previously mentioned appear twice and are types in which two dissimilar radicals appear, for instance, amyl butylamine, hexyl octylamine, etc. Furthermore, compounds may be derived by reactions involving alkylene dichlorides and a mixture of ammonia and amines, or a mixture of two different amines.

It is known that there are numerous other compounds which are akin to the dichloralkyl ethers, in that they are labile or reactive alpha-omega-dichloro derivatives. Thus, well known reactants which supply a divalent linking radical of the kind indicated by T in previous formulas include: Dichlorodiethyl ether (ClC₂H₄OC₂H₄Cl); chloroethoxy triglycol dichloride; tetraglycol dichloride; dichlorodiisopropyl ether (ClC₃H₇OC₃H₇Cl); ββ'-dichlorodiisobutyl ether (ClC₄H₉OC₄H₉Cl); glycerol dichlorhydrin; methyl glycerol dichlorhydrin; polyglycerol dichlorhydrins; dichloracetone

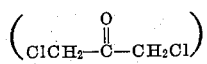

$$\left(ClCH_2-\overset{\overset{O}{\|}}{C}-CH_2Cl\right)$$

derived from acetone; dichlormethylpropyl ketone

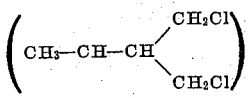

$$\left(CH_3-CH-CH\underset{CH_2Cl}{\overset{CH_2Cl}{<}}\right)$$

etc.

Various other procedures may be employed for producing polyamines of the kind described. For instance, reference is made to our co-pending application Serial No. 273,278, filed May 12, 1939, which subsequently matured as U. S. Patent No. 2,293,494, dated August 18, 1942. In said application there is described the conversion of triethanolamine into an alcoholate, such as monoalcoholate, by means of caustic soda and the like, and subsequently uniting two moles of such compound by means of a material such as glycerol dichlorhydrin. Similarly, the dialcoholate might be treated in the same manner. Incidentally, such alcoholates may be derived from hydroxyalkyl ethers or tertiary amines, as well as materials of the kind exemplified by triethanolamine. See U. S. Patent No. 1,923,178, to Ulrich, Nuesslein, and Koerding, dated August 22, 1933.

Other suitable procedure involves hydroxyamines, such as diethanolamine, an aldehyde, particularly formaldehyde, and a ketone or polyketone having present alphahydrogen atoms. As to such general reactions, see U. S. Patent No. 1,071,007, to Merling, dated August 19, 1913.

In the manufacture of certain diamines and their obvious modifications, which can be made in many instances to yield higher polyamines, i. e., analogous or comparable products having at least three amino nitrogen atoms, generally speaking, if the amine or if ammonia is treated with a reactant having a divalent linking radical and two labile halogen atoms, such as chlorine atoms, one is apt to obtain varying amounts of such higher polyamines. For the sake of brevity, further indications will be limited to procedures for making various suitable polyamines. Such suitable polyamines will be the following:

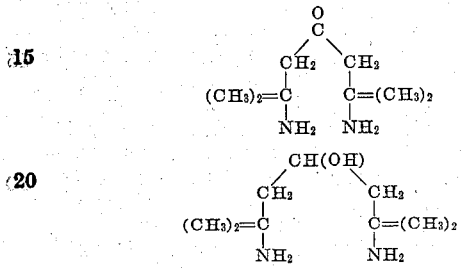

(See German Patent No. 96,657, March 1, 1898.)

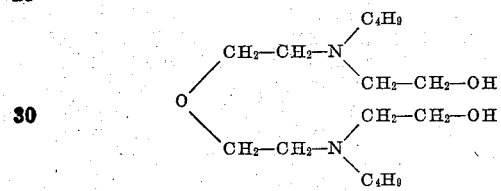

(A)

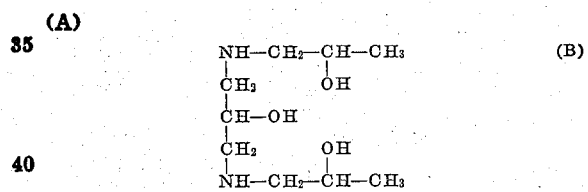

(B)

(See German Patent No. 635,904, to I. G. Farbenindustrie, A.-G., dated October 1, 1936.)

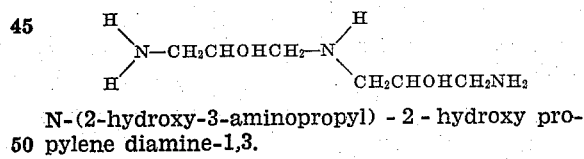

N-(2-hydroxy-3-aminopropyl) - 2 - hydroxy propylene diamine-1,3.

$$\underset{NH_2CH_2CHOHC}{\overset{H}{\diagdown}}\overset{H}{\underset{\diagup}{C}}\text{—CH}_2\text{CHOHCH}_2\text{—N}\underset{CH_2CHOHCH_2NH_2}{\overset{H}{\diagup}}$$

N,N'-di(2-hydroxy-3-amino propyl)-2-hydroxy-propylene diamine-1,3. (See U. S. Patent No. 2,046,720, to Bottoms, dated July 7, 1936.)

See also U. S. Patent No. 2,132,074, to Kartaschoff and Aeschlimann, dated October 4, 1938.

Among products commercially available is 1,3-diamino-2-propanol, which is an especially suitable reactant.

It has been pointed out that polyamines of the kind previously described may be produced or reacted in such a manner that the amino hydrogen atom is replaced by an alkyl radical, a hydroxyalkyl radical, a hydroxyalkyloxyalkyl radical, or the like. It is well known that certain other modifications can be obtained by conventional procedure. For instance, one may introduce acyl radicals derived from acids having 6 carbon atoms or less, such as acetic acid, butyric acid, and the like. Such products are obtained by treatment with acetic anhydride, acetyl chloride, or equivalent reactants. Furthermore, it is known that one can obtain derivatives of amines of the kind described by reactions with chlorhydrins derived from polyglycols, polyglycerols and the like, such as diglycerol chlorhydrin, the chlorhydrin derived from the dihydric alcohol obtained by etherizing two moles of diethylene glycol, etc. Similarly, amino hydrogens may be substituted by reaction with compounds of the kind typified by ethyl chloracetate, i. e., esters of carboxy acids in which an alphahydrogen has been substituted by chlorine. Similarly, as has been suggested previously, aminoalkyl chlorides may be employed so as to introduce an aminoalkyl group. As an example of such aminoalkyl halide, reference is made to the description of certain examples found in U. S. Patent No. 2,014,077, dated September 10, 1935, to Wilson. As will be pointed out subsequently, the intention is to introduce an acyl radical derived from a higher molecular weight carboxy acid. In some instances, amides already containing such acyl radical may be treated with the reactant containing a linking radical of the kind described. Furthermore, in certain instances polyamines such as diamines may be employed. Certain other compounds may be looked upon as instances in which one of the amino hydrogen atoms of a polyamine, particularly a diamine, has been replaced by an amino-alkyl group. For instance, one might react two moles of oleyl-diethyl ethylenediamine with one mole of ββ' dichlorethyl ether. For the sake of brevity, in the hereto appended claims the expression "alkyloxyalkyl" is intended to include the type of oxyhydrocarbon radical where the hydrocarbon chain is interrupted more than once by an oxygen atom. Similarly, since materials such as ethyl chloracetate are sometimes spoken of as alkylating agents, it is intended that the expression "alkyl" will include the type of radical so introduced, i. e., a radical exemplified by the following:

$$CH_2COOC_2H_5$$

although, strictly speaking, it is not, of course, an alkyl radical.

Summarizing what has been said thus far, it is apparent that one could readily obtain amines of the following type:

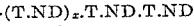

in which $x$ is a small whole number less than 10 but including zero, T has its previous significance and D may be hydrogen, alkyl, alkylol, hydroxyalkyloxyalkyl, aminoalkyl, R'CO, R'CO.OX, and R'CO.OX', in which R'CO is an acyl radical derived from a lower molecular weight carboxy acid having six carbon atoms or less; R'CO.OX is a radical in which OX represents a divalent radical obtained at least hypothetically by the removal of a hydroxyl hydrogen atom from an alkylol radical; and R'CO.OX' denotes a radical in which OX' represents a radical derived at least hypothetically by the removal of a hydroxyl hydrogen atom from a hydroxyalkyloxyalkyl radical.

If one adds the proviso that there must be a reactive hydrogen atom present in such polyamine, i. e., a hydrogen atom linked to a nitrogen atom or to an oxygen atom, one then has an acylation-reactive polyamine. In other words, such polyamine can be acylated so as to introduce a high molecular weight carboxy acid acyl group in the same manner that any other amine can be acylated, i. e., an ordinary monoamine or diamine. Thus, the methods for acylating ordinary monoamines which are primary or secondary are well known. Likewise, a suitable procedure for acylating diamines, including hydroxylated diamines, is well known. In such instances one employs a suitable acid or any functional equivalent. For convenience, amines of the above type which can be acylated, i. e., have present a reactive hydrogen atom, will be referred to as acylation-reactive amines. Such acylation products may be of the amide type, in other words, of a type in which the acyl group is directly attached to the amino nitrogen atom; or they may be of the ether type, where the acyl group replaces a hydroxyl hydrogen atom, and thus is linked to a nitrogen atom through a carbon chain; or the acylation derivative may exemplify both types where the amine employed as a raw material has present at least one amino hydrogen atom and at least one hydroxyl hydrogen atom. As has been previously stated, it is unnecessary to describe to any length the method of producing the acylation products, except to indicate that the same means may be employed as in connection with the acylation of any ordinary amine, whether a monoamine or a diamine. Attention is also directed to the fact that after acylation of the polyamines herein described, the subsequent reaction product, i. e., the acylation reaction product, if it still contains a reactive hydrogen atom, may be reacted with an oxyalkylating agent, such as ethylene oxide, propylene oxide and the like, so as to introduce oxyalkyl radicals, for instance, with the result that an amino hydrogen atom is converted into a hydroxyethyl radical.

As to the conventional procedure for the acylation of polyamines, regardless of type, reference is made to the following U. S. patents: No. 1,924,698, dated August 29, 1933, Neelmeier, Nocken, and Friedrich; 1,947,951, dated Feb. 20, 1934, Neelmeier, Nocken, and Friedrich; 2,075,109, dated March 30, 1937, Friedrich; and 2,008,649, dated July 16, 1935, Ulrich and Nuesslein.

It is understood that the intermediate product used to form the new composition of matter herein contemplated, and particularly, when said new composition is to be used as a demulsifier, may be prepared in any suitable manner. It is not intended that the hereto attached claims be limited in any respect as to the method of manufacture, unless such method of manufacture is specifically recited. As has been stated, it is our preference to obtain an acylation-reactive amine of the type or kind just described, and react the same with a higher molecular weight carboxy acid, or its functional equivalent, and thus obtain the intermediate material. Such acylated intermediate product must still contain a reactive hydrogen atom. It is our preference to use the detergent-forming acid type, which includes fatty acids, resin acids, and petroleum acids. Such petroleum acids may be naturally-occurring acids, such as naphthenic acids, or may be obtained by the oxidation of paraffin or the like. Although any functional equivalent may be employed, our preference is to employ the acid or ester. Of the various detergent-forming acids which may be employed, we prefer to use fatty acids, and most particularly, hydroxylated fatty acids, such as ricinoleic acid.

INTERMEDIATE PRODUCT

Example 1

One mole of 1,3-diamino-2-propanol is acylated with one mole of ricinoleic acid, using a temperature of approximately 125° C. The temperature is allowed to rise as acylation takes place.

INTERMEDIATE PRODUCT

Example 2

Oleic acid is substituted for ricinoleic acid in the above example.

INTERMEDIATE PRODUCT

Example 3

A non-fatty, detergent-forming acid, such as a purified naphthenic acid, abietic acid, or petroleum acids derived by the oxidation of paraffin, is substituted for ricinoleic acid in Example 1.

INTERMEDIATE PRODUCT

Example 4

One mole of N-(2-hydroxy-3-amino propyl)-2-hydroxy propylene diamine-1,3 is acylated with three moles of ricinoleic acid. A higher temperature may be suitably employed, for instance, a temperature of approximately 180° C.

INTERMEDIATE PRODUCT

Example 5

In the preceding example, other suitable detergent-forming acids of the kind referred to in Examples 2 and 3, preceding, are substituted for ricinoleic acid in Example 4.

INTERMEDIATE PRODUCT

Example 6

N,N'- di(2-hydroxy-3-amino propyl)-2-hydroxy propylene diamine-1,3 is substituted for N-(2-hydroxy-3-amino propyl)-2-hydroxy propylene diamine-1,3 in the two preceding examples, to wit, 4 and 5.

INTERMEDIATE PRODUCT

Example 7

The usual procedure for manufacture of polyamines from ammonia or an ammonium salt or an amine is followed, except that $\beta\beta'$ dichloroethyl ether is substituted for an alkylene dichloride, such as ethylene dichloride.

As to the manufacture of such compounds, see the aforementioned U. S. Patent No. 1,919,301 to Morton, and in addition, U. S. Patent No. 1,840,932, to Cadwell, dated January 12, 1932, and U. S. Patent No. 2,049,467, to Nookin, dated March 4, 1936. Having obtained a mixture of such polyamines, no particular effort is made to obtain a separation, but the mixture is employed as such. It is to be noted that an equally effective amine can be obtained from amylamine, or from octylamine, as from ammonia. Based on the average molecular weight, a suitable proportion of such amines is acylated with one or more of the various detergent-forming acids described in the previous examples, and particularly, by use of ricinoleic acid. The temperature of acylation preferably starts at the boiling point of the lowest amine present; but in any instance, one need not employ a temperature of over 100° C.

INTERMEDIATE PRODUCT

Example 8

Following the procedure of the aforementioned U. S. Patent to Merling No. 1,071,007, a suitable diamine is obtained by the use of diethanolamine, formaldehyde, and acetone. The product so obtained is acylated in the manner described in previous examples, and particularly, employing ricinoleic acid.

INTERMEDIATE PRODUCT

Example 9

A material of the kind indicated by Formula A, preceding, and prepared according to directions found in aforementioned German Patent No. 635,904, is acylated with one mole of ricinoleic acid. The diamine used as a raw material is indicated structurally by the following formula:

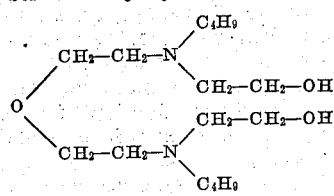

INTERMEDIATE PRODUCT

Example 10

One mole of a material of the kind indicated by Formula B, preceding, and made according to directions found in German Patent No. 635,904, is acylated with two moles of ricinoleic acid. The diamine used as a raw material is indicated structurally by the following formula:

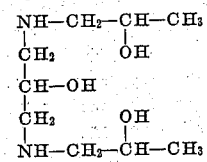

INTERMEDIATE PRODUCT

Example 11

Triethanolamine is converted into the monoalcoholate by treatment with caustic soda. Two moles of the sodium alcoholate so derived are reacted with one mole of glycerol dichlorhydrin so as to yield a product of the following structure:

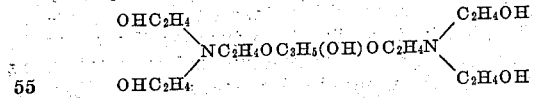

Such material is then acylated with two moles of ricinoleic acid in the manner previously described, i. e., by heating for approximately 2-6 hours at 160-175° C.

INTERMEDIATE PRODUCT

Example 12

Various other detergent-forming acids of the kind previously described, such as oleic acid, naphthenic acid, abietic acid, oxidized petroleum acids, and the like, are substituted for ricinoleic acid in the preceding example.

INTERMEDIATE PRODUCT

Example 13

Hydroxyethyl ethylene diamine is treated with $\beta\beta'$ dichlorethyl ether in approximately the same manner indicated in aforementioned U. S. Patent No. 1,909,301 to Morton. The product so obtained is a mixture but contains a substantial proportion of a material of the following composition:

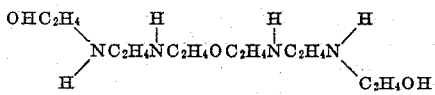

Such product is acylated in the manner described in Example 12.

INTERMEDIATE PRODUCT

*Example 14*

In place of ricinoleic acid, in Example 13, various other detergent-forming acids are used, such as oleic acid, naphthenic acid, etc., but in monomolecular proportions.

It is to be noted that no effort is made in the preparation of the intermediate products, or in the compositions of matter herein contemplated, to obtain any specific isomer, unless so indicated by the structural formula. As far as we are aware, one isomer is just as suitable as another for the various purposes indicated, and particularly, for use in the production of a demulsifier. What is said of the isomers in unacylated forms applies with equal force and effect to the acylated forms, and also after reaction with a polybasic carboxy acid compound, as hereinafter described.

As has been stated previously, no particular directions are required in regard to such acylation procedure. Generally speaking, one must employ a temperature below the boiling point of the amine employed, although as acylation takes place, the temperature may be permitted to rise. Many of the amines have boiling points above 180° C. Under such circumstances, one can use a higher temperature and hasten the reaction, for instance, may employ a temperature of 180° C. If the amine is especially low boiling, pressure might be suitably employed, and the reaction preferably conducted in such a manner as to remove the water of reaction.

One can obtain the amide ester type by acylating an amine in such a manner that more acyl groups are introduced than there are available either amine hydrogen atoms considered by themselves or alcoholic hydroxyl radicals considered by themselves. One can produce the ester type in a number of ways, for instance, by acylation of an amine which contains no amino hydrogen atom. One can produce the amino type by employing an amine which does not contain hydroxyl radicals, i. e., the keto type or the ether type; or even if a hydroxyl radical is present, acylation can be conducted by means of an amide, such as ricinoleoamide, with the formation of an amide in the substantial absence of any water.

Previous reference has been made to the introduction of an aminoalkyl radical in place of an amino hydrogen atom. The availability of a compound of the following types:

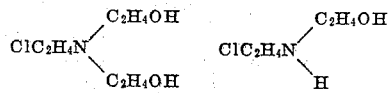

would permit the introduction of a hydroxyalkylamino radical. However, the introduction of such type radical is more feasible by introducing an aminoalkyl radical from a compound such as, for instance, chloramylamine

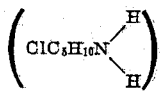

The use of such halide permits the introduction of the aminoalkyl radical $NH_2.C_5H_{10}$. Such radical, after being introduced into the polyamine nucleus, whether prior to or after acylation, can, of course, be treated with an oxyalkylating agent, such as ethylene oxide, or any similar alkylene oxide or with glycid, epichlorhydrin and other reagents, so as to convert one or both of the amino hydrogen atoms in the above described aminoalkyl radical into a hydroxyalkyl radical, or, in the case of ethylene oxide, into a $C_2H_4OH$ radical. Needless to say, such a radical, which is in essence an alkylolamine radical, or an alkylolamine residue, can be acylated by esterification of either high molecular weight or low molecular weight fatty acids, in the same manner that has been described previously in regard to any alcoholic hydroxyl or amino hydrogen atom which happens to be present.

Attention is directed to the fact that the word "amidification" has been applied to the reaction involving the replacement of an amino hydrogen atom by an acyl radical, without conventional limitation to a reaction involving ammonia. The replacement of the amino hydrogen atom of a primary amine or a secondary amine by an acyl radical has been considered as being amidification, rather than the formation of a substituted amide, or the formation of an imide or substituted imide. Such obvious departure from conventional nomenclatures has been for purposes of simplicity and to show the similarity between certain reactions.

In summary, it is obvious that the acylated derivative, i. e., the acylated polyamine containing at least one acyl radical derived from a high molecular weight carboxy acid, and which has been referred to as an intermediate material, can be characterized by the following formulas:

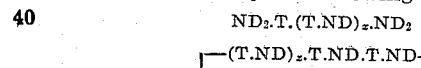

in which $x$ is a small whole number including 0, but in any event, less than 10, and preferably 1 to 4; T is an oxyhydrocarbon radical selected from the class consisting of the keto type, the ether type, and the alcohol type; and D may be hydrogen, alkyl, alkylol, hydroxyalkyloxyalkyl, aminoalkyl, hydroxyalkylamino, RCO, RCOOX, RCOOX', RCOOX'', RCOOX''', R'CO, R'COOX, R'COOX', R'COOX'', and R'COOX''', in which RCO is an acyl radical derived from a higher molecular weight carboxy acid having more than 6 carbon atoms; R'CO is an acyl radical derived from a lower molecular weight carboxy acid having 6 carbon atoms or less; OX represents a divalent radical obtained at least hypothetically by removal of a hydroxyl hydrogen atom from an alkylol radical; OX' represents a radical derived at least hypothetically by removal of a hydroxyl hydrogen atom from a hydroxyalkyloxyalkyl radical; OX'' represents a divalent radical derived at least hypothetically by the removal of an amino hydrogen atom from an amino alkyl radical; and OX''' represents a radical derived at least hypothetically by removal of a hydroxy hydrogen atom from a hydroxyalkylamino radical; and RCO must occur at least once; and there must be present at least one reactive hydrogen atom.

It is to be understood that the compound herein contemplated may be manufactured in any suitable manner; and one is not dependent upon following the exact procedure previously outlined.

In certain instances the other reactants might be employed, or else reactants of the kind previously described might be combined in some other manner. As indicated, it is not intended that the hereto appended claims be limited in any manner whatsoever as to the method of manufacture, unless such method is specifically recited. The bulk of the compounds so obtained are very complex in nature, and their structure is only partially understood.

In the manufacture of the new composition of matter herein contemplated, particularly, when the same is intended to be employed for the purpose of breaking oil field emulsions, one may use any suitable procedure to obtain or produce said compositions of matter; and it is not intended that the hereto appended claims be limited in any way as to the particular method of procedure employed to produce or manufacture the said new compositions of matter. However, said compositions of matter are most readily manufactured by first obtaining intermediate raw materials of the kind above described, and reacting the same with a polybasic carboxy acid body, and particularly, one of the kind characterized by the fact that at least one carboxyl radical of such polybasic carboxy acid has been joined to a hydroxylated detergent-forming acid body, by virtue of the fact that said detergent-forming acid body contains a hydroxyl group, as part of the acyl radical, or by virtue of the fact that it represents a polyhydroxylated ester of such detergent-forming acid of the kind characterized by the presence of a free hydroxyl radical as part of the polyhydric alcohol residue. Triricinolein illustrates one type of hydroxylated detergent-forming material; monostearin illustrates another type; monoricinolein illustrates the combination type.

Returning, then, to the intermediate raw materials previously described, it is to be noted that in each instance there is present at least one reactive amino hydrogen atom, i. e., the hydrogen atom linked to either oxygen or nitrogen. Thus, combination can readily take place with typical polybasic carboxy acids, such as phthalic acid, succinic acid, malic acid, fumaric acid, citric acid, maleic acid, adipic acid, tartaric acid, glutaric acid, diphenic acid, naphthalic acid, tricarballylic acid, etc. Instead of acids, one may, of course, use any functional equivalent, particularly the anhydride. The anhydride, when available, is a particularly suitable reactant when two carboxyl radicals are attached to adjacent carbon atoms. The most suitable acids are oxalic acid, maleic acid, and phthalic acid. The two latter are conveniently used in the form of the anhydride, i. e., maleic anhydride and phthalic anhydride.

Depending upon the composition of the intermediate raw material selected, one may obtain esterification without amidification, or one might obtain amidification without esterification; or one might obtain a product characterized by containing both the amide linkage and the ester linkage. Since these reactions are entirely analogous to the reactions involving the high molecular weight carboxy acids previously described, it is not believed necessary to repeat the procedure by which the various types could be obtained.

As to the manufacture of various compositions of matter of the kind herein contemplated, it is to be understood that any residual carboxylic hydrogen atoms derived from polybasic carboxy acids may remain as such, or may be replaced by any suitable equivalent, such as a metal, or a hydrocarbon radical, or an amine residue. In other words, one is not limited to the use of a polybasic carboxy acid; but one might employ some suitable form in which one carboxylic hydrogen atom had already been replaced in a manner above described. For instance, one might use sodium hydrogen phthalate, potassium hydrogen phthalate, sodium hydrogen maleate, potassium hydrogen maleate, octyl hydrogen phthalate, cetyl hydrogen maleate, ethyl hydrogen phthalate, or the like, in place of the polybasic carboxy acids themselves. Polybasic acids having more than two carboxyls may have two such substituents, such as disodium citrate.

Similarly, the acidic material containing a free carboxyl radical may be neutralized with a suitable base, esterified with a suitable alcohol, particularly an aliphatic alcohol, such as ethyl, methyl, propyl, butyl, or octyl alcohol; or one may eliminate the acidic hydrogen carboxyl, if present, by an amine, so as to form a substituted ammonium salt; or if the amine is hydroxylated, as in the case of triethanolamine, one may form an ester in which the amine supplies the alkyl radical.

In the preferred type of material, we employ a compound in which, as has been previously indicated, a carboxyl group of the polybasic carboxy acid has been caused to unite with a hydroxylated detergent-forming acid body. As has been previously noted, the detergent acids include fatty acids, particularly the higher fatty acids, resin acids, petroleum acids, such as naturally-occurring petroleum acids, and also petroleum acids obtained by the oxidation of paraffin hydrocarbons or the like. For the sake of brevity, reference will be made principally to phthalic anhydride. One mole of phthalic anhydride may be esterified with a mole of ricinoleic acid, diricinoleic acid, polyricinoleic acid, chlororicinoleic acid, or the like. Similarly, one might employ an ester, such as ethyl ricinoleate, propyl ricinoleate, butyl ricinoleate, octyl ricinoleate, benzyl ricinoleate, cyclohexyl ricinoleate, etc.

Another suitable procedure would be to employ one or two moles of the phthalic anhydride and the ester of a dihydric alcohol, such as ethylene glycol, diricinolein, propylene glycol diricinoleate, etc. Similar derivatives may be obtained from hydroxystearic acid or polyhydroxylated stearic acids of the kind described in U. S. Patent No. 1,835,203, dated December 8, 1931, to Bruson. Likewise, one may employ the esters of glycerine, such as triricinolein, trihydroxystearin, etc.

Instead of depending upon the hydroxyl group as being part of the acyl radical, one may, as previously suggested, employ compounds in which the hydroxyl radical is part of the polyhydric alcohol residue. Thus, one might employ monostearin, mono-olein, mononaphthenin, monoabietin, or similar compounds obtained from oxidized petroleum acids. One can also employ the type of materials in which there are two acyl groups attached to the polyhydric alcohol residues, for instance, distearin, di-olein, dinaphthenin, etc. Similar hydroxylated compounds can be derived from the various glycols, from materials such as sorbitol, mannitol, sorbitan, mannitan, pentaerythritol, diglycerol, triglycerol, polyglycerol, diglycols, polyglycols, etc. Similarly, one may obtain materials of the kind in which there is at least one hydroxyl radical present as part of the acyl group, and at least one hydroxyl radical present as part of the polyhydric alcohol residue, as, for example, monoricinolein, monohydroxystearin, diricinolein, dihydroxystearin, the ricinoleic mono-ester of ethylene glycol, or similar glycols, etc.

The manufacture of the corresponding acid phthalates, or for that matter, the acid maleates, acid citrates, and numerous other products, is so well known that further discussion may be eliminated.

Having obtained any of these hydroxylated materials, they may be esterified in the conventional manner to produce acid derivatives of the kind described, i. e., the acid phthalate, acid maleate, acid oxalate, etc. If the polybasic acid contains more than two carboxyl radicals, one may obtain compounds characterized by the presence of two free carboxyl radicals; or such polybasic acid may combine with two moles of the hydroxylated material, and one may still obtain a compound characterized by the presence of a free carboxyl.

Our preference is to employ materials derived from ricinoleic acid or containing the ricinoleyl radical. Although the manufacture of these materials is well known, reference is made to U. S. Patent No. 2,166,431, dated July 18, 1939, to De Groote, and particularly, the matter beginning with page 4, right hand column, line 36, and continuing through page 5, right hand column, line 16.

Similarly, it is intended particularly to call attention to U. S. Patent No. 2,166,433, to De Groote, dated July 18, 1939, and specifically to the matter which appears beginning at page 4, right hand column, line 49, and continuing through page 6, right hand column, line 62.

The following are examples of compositions of matter embodying our invention, that are particularly effective demulsifiers for petroleum emulsions of the water-in-oil type:

COMPOSITION OF MATTER

Example 1

An intermediate product of the kind exemplified by "Intermediate product, Example 1," previously described, is reacted with a molar proportion of monophthalated triricinolein. The reaction is conducted at about 140–180° C. until all free carboxyl radicals have disappeared. The reaction may require about 1–8 hours, although generally it is complete within a 2–4 hour range.

COMPOSITION OF MATTER

Example 2

The same procedure is employed as in the foregoing example, except that diphthalated triricinolein is employed.

COMPOSITION OF MATTER

Example 3

"Intermediate product, Example 4," previously described, as substituted for "Intermediate product, Example 1" in the two preceding Composition of matter examples.

COMPOSITION OF MATTER

Example 4

A material of the following composition:

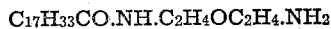
$C_{17}H_{33}CO.NH.C_2H_4OC_2H_4.NH_2$ (See British Patent No. 364,104, to Johnson, communicated by I. G. Farbenindustrie, A.-G., 1932) is treated in the manner previously indicated in Composition of matter, Examples 1 and 2.

COMPOSITION OF MATTER

Example 5

"Intermediate product, Example 8" is substituted for "Intermediate product, Example 1," in Composition of matter, Examples 1 and 2.

COMPOSITION OF MATTER

Example 6

Intermediate products exemplified by "Intermediate product, Examples 9 and 10," preceding, are used in place of "Intermediate product, Example 1," following the procedure outlined in Composition of matter, Examples 1 and 2.

COMPOSITION OF MATTER

Example 7

"Intermediate product, Example 11" is used in place of "Intermediate product, Example 1," following the procedure indicated in Composition of matter, Examples 1 and 2.

COMPOSITION OF MATTER

Example 8

Maleated derivatives of triricinolein or the like are substituted for the phthalated derivatives employed in the previous examples.

It is to be noted that all acyl radicals present and derived from polybasic carboxy acids need not be directly linked to the amine nucleus. For instance, diphthalated triricinolein might be combined with a selected intermediate material of the kind described in such a way that only one phthalyl radical unites the amine nucleus with the triricinolein nucleus. The residual phthalic acid carboxy radical may remain as such, i. e., in the acidic state, or might be neutralized in any of the ways or manners herein described. Another example would be a type which has been illustrated, in which a material such as monophthalated triricinolein, is united with a selected raw material, and subsequently treated with some polybasic carboxy acid, not necessarily phthalic acid, so as to introduce a polybasic acid residue, which, in turn, is unattached to the amine nucleus. In brief, then, if the hydroxylated detergent-forming acid body contains more than one polybasic acid residue, only one of such residues or radicals need be united to the amine nucleus; or if there are residual hydroxyl radicals attached to the detergent-forming acid radical, such hydroxyls can be acylated with any suitable acid, or its functional equivalent, including low molar monocarboxy acids. However, our preferred form is one in which there is at least one polybasic carboxy acid residue attached to the hydroxylated detergent-forming acid residue, without, in turn, being attached to the amine nucleus. Generally speaking, this predicates the presence of two or more acyl radicals derived from polybasic acids, one or more forming a link with an amine nucleus, and one or more being present and not linked to the amine nucleus.

In general, all the acylation reactions of the kind described take place readily by reactions involving the selected materials in such a manner that any water which is formed is eliminated. Acylation can be accompanied by the elimination of some other compound, such as $NH_3$ or HCl. Usually, this means employment of a temperature above 120° C. and below the point of decomposition. Generally, a temperature of 140–180° C. is most suitable. A dry, inert gas may be passed through the mass during reaction to hasten acylation.

As has been pointed out previously, one is not limited to any particular procedure of manufacture. For instance, it is manifest that a selected intermediate material of the kind described could be acylated with a material such as a phthalic acid, and then treated with triricinolein, or the like, so that a chemical combination would take place between the phthalic anhydride radical and the triricinolein radical. It is understood, of course, that such acylation reactions do not include salt formation. In other words, if the intermediate raw material is of the basic type, it can form a salt with an acid, such as citric acid, or phthalic acid. On heating such salts, acylation products are obtained.

The word "acyl" in reference to a radical derived from a polybasic acid means the radical derived by the removal of one or more carboxy hydroxyl radicals. It is immaterial whether the remaining carboxyl radicals are present as such, or in the salt or ester form, as previously described. Since at times there is some confusion as to the use of the word "acyl" or the like in connection with polybasic acids, insofar that there is more than one carboxy hydroxyl group present, it is deemed desirable specifically to point out that the word "acyl" or its equivalent is used in the present instance to mean the removal of one or more carboxy hydroxyl groups, without limitation as to the nature of any carboxyl groups that may remain, i. e., without limitation as to being in the acidic state or neutralized state. This may be illustrated in the following manner:

If a polybasic acid be indicated by the following formula:

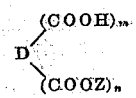

in which D represents a polybasic acid residue, $m$ and $n$ represent small whole numbers including zero, and usually not over three, with the proviso that $m$ plus $n$ must be at least 2, and Z represents any metal, ammonium radical, substituted ammonium radical, monovalent or polyvalent organic radical, which replaces a carboxylic hydrogen, then examples of acyl radicals derived from such polybasic carboxy acids include the following types:

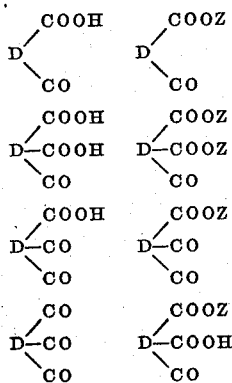

The word "phthalyl" will be given the corresponding breadth of definition.

For the sake of simplicity, in the hereto appended claims the expressions "acidyl" and "acidylation" will be used to refer to the acyl and acylation products which involve a polybasic carboxy acyl radical. The expressions "acyl," "acidyl," and "acylation" and "acidylation" are ordinarily used interchangeably. In the present instance, since the final product contains both acyl radicals derived primarily from monocarboxy acids and acyl radicals derived from polybasic carboxy acids, the expression "acyl" will be concerned with radicals derived primarily from monocarboxy acids; whereas, the expressions "acidyl" and "acidylation" will be employed in connection with the polybasic carboxy acids.

In such instances where the acylation product, i. e., the intermediate material, contains at least two hydroxyl radicals, or at least two amino hydrogen atoms, or at least one hydroxyl radical and at least one amino hydrogen atom, then one is dealing with a polyfunctional or bifunctional compound; and thus reactions involving such types of compounds with a polybasic acid or dibasic acid, such as phthalic anhydride, will produce a sub-resinous or semi-resinous type of material. Compare analogous reactions involving glycerol or glycol or monoethanolamine with dibasic or polybasic acids. Our preferred reagent is derived from an intermediate raw material which is polyfunctional and is most desirably of the sub-resinous type, although it may be a monomer, dimer, or trimer. In other words, it is preferably a compound or a mixture of compounds which still represents a liquid or plastic or fusible mass at a temperature in which the final reaction is completed and is soluble in one or more solvents which may be hydrophobe or hydrophile in nature, including solutions of such acids as acetic acid, hydrochloric acid, etc. Polymers may represent a repeated monomer with elimination of water or the like.

Certain obvious functional equivalents suggest themselves and need not be described in detail. For instance, a halogenated ricinoleic acid body might be employed just as advantageously as an ordinary ricinoleic acid body. No advantage would be obtained by the use of more expensive raw material. Similarly, chlorinated phthalic anhydride or acid might be used in place of the less expensive raw material.

In view of what has been said, it is manifest that the acylated polyamine of the kind herein contemplated as intermediate products may be indicated by the following formulas:

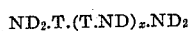
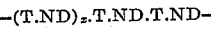

in which $x$ is a small whole number less than 10 but including 0; T is an oxyhydrocarbon radical selected from the class consisting of the keto type, the ether type, and the alcohol type, and D may be hydrogen, alkyl, alkylol, hydroxyalkyloxyalkyl, aminoalkyl, hydroxyalkylamine, RCO, RCO.OX, RCO.OX', RCO.OX'', RCO.OX''', R'CO, R'CO.OX, R'CO.OX', R'CO.OX'', and R'CO.OX''', in which RCO is an acyl radical derived from a higher molecular weight carboxy acid having more than 6 carbon atoms; R'CO is an acyl radical derived from a lower molecular weight carboxy acid having 6 carbon atoms or less; OX represents a divalent radical obtained by removal of a hydroxyl hydrogen atom from an alkylol radical; OX' represents a radical derived by removal of a hydroxyl hydrogen atom from a hydroxyalkyloxyalkyl radical; OX'' represents a divalent radical derived by the removal of an amino hydrogen atom from an aminoalkyl radical; and OX''' represents a radical derived by removal of a hydrogen atom from a hydroxyalkylamino radical; and with the added proviso that RCO must occur at least once; and additionally characterized by the fact that there must be present an amino hydrogen atom.

It is to be noted that some of the compounds described are basic in character, due to the presence of an unacylated basic amino nitrogen atom, or due to the presence of an esterified group of the kind described. In such instances the compound may be employed as such, or may be employed in basic form (i. e., after combination with water), or may be employed in salt form by reaction with an acid such as acetic acid, lactic acid, hydrochloric acid, or any other suitable acid.

One need not point out that phthalic acid is used most conveniently in the form of the anhydride; and reference in the hereto appended claims to "acidyl radicals derived from phthalic acid" means, of course, that they are most conveniently derived from phthalic anhydride. Thus, the words "phthalic acid" and "phthalic anhydride" in the claims could be interchanged without any change in the meaning.

Having thus described our invention, what we claim as new and desire to secure by Letters Patent is:

1. A sub-resinous acidylation derivative of a reactive hydrogen-atom-containing acylated compound of the formula:

$$ND_2.T.(DN.T)_x.ND_2$$

in which $x$ is a small whole number less than 10 but including zero; T is a divalent radical in which the carbon atom chain of a hydrocarbon radical containing not over 12 carbon atoms, has been interrupted at least once by a member of the class consisting of oxygen atoms, carbonyl radicals and hydroxymethylene radicals; and D is selected from the class consisting of hydrogen atoms, alkyl radicals having less than 12 carbon atoms, alkylol radicals having less than 12 carbon atoms, hydroxyalkyloxyalkyl radicals having less than 12 carbon atoms, RCO, RCO.OX and RCO.OX' in which RCO is the acyl radical of a detergent-forming monocarboxy acid having at least 8 and not more than 32 carbon atoms; OX represents a divalent radical obtained by removal of a hydroxyl hydrogen atom from an alkylol radical having less than 12 carbon atoms; OX' represents a divalent radical derived by removal of an hydroxyl hydrogen atom from a hydroxyalkyloxyalkyl radical having less than 12 carbon atoms; and with the added proviso that RCO must occur at least once in said acylated compound, and said acidyl radical being that of a polycarboxy acid.

2. The sub-resinous acidylation derivative of claim 1, wherein the acidyl radical is a dicarboxy acid radical.

3. The sub-resinous acidylation derivative of claim 1, wherein the acidyl radical is a dicarboxy acid radical and the detergent-forming monocarboxy acid radical is a fatty acid radical.

4. The sub-resinous acidylation derivative of claim 1, wherein the acidyl radical is a dicarboxy acid radical and the detergent-forming monocarboxy acid radical is a fatty acid radical having 18 carbon atoms.

5. The sub-resinous acidylation derivative of claim 1, wherein the acidyl radical is a dicarboxy acid radical and the detergent-forming monocarboxy acid radical is a higher unsaturated fatty acid radical having 18 carbon atoms.

6. The sub-resinous acidylation derivative of claim 1, wherein the acidyl radical is a dicarboxy acid radical and the detergent-forming monocarboxy acid radical is the ricinoleyl radical.

7. The sub-resinous acidylation derivative of claim 1, wherein the acidyl radical is a dicarboxy acid radical and the detergent-forming monocarboxy acid radical is the oleyl radical.

8. The sub-resinous acidylation derivative of claim 1, wherein the acidyl radical is a dicarboxy acid radical and the detergent-forming monocarboxy acid radical is the linoleyl radical.

MELVIN DE GROOTE.
BERNHARD KEISER.